United States Patent [19]

Carreiro et al.

[11] Patent Number: 5,878,278
[45] Date of Patent: Mar. 2, 1999

[54] SYSTEM FOR CONTROLLING CONNECTION REQUESTS BY EACH IO CONTROLLERS STORING AND MANAGING A REQUEST QUEUE WHEREIN ADDITIONAL CHANNEL ADDRESSES CAN BE ADDED

[75] Inventors: Paul Peixoto Carreiro; Alena Chang, both of San Jose; Duc Tich Doan, Fremont; Robert R. Fish, San Jose, all of Calif.

[73] Assignee: International Business Machines Corporation, Armonk, N.Y.

[21] Appl. No.: 679,167

[22] Filed: Jul. 12, 1996

Related U.S. Application Data

[63] Continuation of Ser. No. 316,994, Oct. 3, 1994, abandoned.
[51] Int. Cl.[6] .................................................. G06F 13/14
[52] U.S. Cl. ........................ 395/859; 395/826; 395/850; 395/874; 395/730
[58] Field of Search ............................. 395/826, 850, 395/859, 874, 730

[56] References Cited

U.S. PATENT DOCUMENTS

| | | |
|---|---|---|
| 3,564,502 | 2/1971 | Boehner et al. . |
| 4,113,991 | 9/1978 | Gorham et al. ........................... 379/100 |
| 4,139,739 | 2/1979 | von Meister et al. ................... 379/207 |

(List continued on next page.)

FOREIGN PATENT DOCUMENTS

| | | |
|---|---|---|
| 58-102359 | 6/1983 | Japan . |
| 59-212983 | 12/1984 | Japan . |
| 61-142574 | 6/1986 | Japan . |
| 61-271530 | 12/1986 | Japan . |
| 63-026049 | 2/1988 | Japan . |
| 63-057943 | 3/1988 | Japan . |
| 01-041046 | 2/1989 | Japan . |
| 01-161428 | 6/1989 | Japan . |
| 01-282709 | 11/1989 | Japan . |
| 02-081532 | 3/1990 | Japan . |
| 02-260204 | 10/1990 | Japan . |
| 03-79860 | 4/1991 | Japan . |
| 04-076854 | 3/1992 | Japan . |
| 04-235638 | 8/1992 | Japan . |

OTHER PUBLICATIONS

*IBM Technical Disclosure Bulletin*, "Method for Dialing Automated Rolodex Topic Entry," vol. 37, No. 2A, Feb. 1994, pp. 91–92.

(List continued on next page.)

*Primary Examiner*—Thomas C. Lee
*Assistant Examiner*—Ki S. Kim
*Attorney, Agent, or Firm*—George E. Clark; Philip R. Wadsworth

[57] ABSTRACT

A data processing system includes a central processing complex consisting of one or more processor units, each of the processor units having one or more input/output channels, a transmission medium connected to each of the input/output channels, and one or more peripheral device controllers such as for controlling one or more direct access storage devices (DASD). In systems having more than one input/output channels, it is common to include a switching mechanism connected between the input/output channels and the control devices for enabling connection between one of a number of controllers and one of a number of channels. Each control device will include an automatic frame transmission function which includes apparatus and method for controlling transmission of frames of information between the control device and the channel. A queue of reconnection requests is constructed and a state machine controls the queue. For example, the state machine reads the queue, loads and sends frames from the controller to the channel, manages a redrive timer and automatically redrives or terminates automatic frame transmission processing depending on system parameters and responses received from the channel or from another controller in controller to controller transmissions.

10 Claims, 6 Drawing Sheets

U.S. PATENT DOCUMENTS

| | | | |
|---|---|---|---|
| 4,166,929 | 9/1979 | Sheinbein | 379/207 |
| 4,191,997 | 3/1980 | Luiz | 395/728 |
| 4,271,468 | 6/1981 | Christensen et al. | 395/859 |
| 4,396,984 | 8/1983 | Videk, II | 395/858 |
| 4,435,755 | 3/1984 | Meritt | 395/858 |
| 4,495,571 | 1/1985 | Staplin et al. | 395/293 |
| 4,797,779 | 1/1989 | Richards et al. | 361/154 |
| 4,912,707 | 3/1990 | Kogge et al. | 395/182.15 |
| 4,967,344 | 10/1990 | Scavezze et al. | 395/182.02 |
| 5,025,458 | 6/1991 | Casper et al. | 375/365 |
| 5,067,071 | 11/1991 | Schanin et al. | 395/293 |
| 5,101,477 | 3/1992 | Casper et al. | 395/872 |
| 5,119,488 | 6/1992 | Takamatsu et al. | 395/182.02 |
| 5,290,386 | 3/1994 | Trudeua | 156/350 |
| 5,644,712 | 7/1997 | Coscarella et al. | 395/829 |

OTHER PUBLICATIONS

*IBM Technical Disclosure Bulletin,* "Reason Code for Logical Path Removed," No. 10B, Mar. 1991, pp. 102–103.

*IBM Technical Disclosure Bulletin,* "Serial Link Communication Module for Local Work Station Attachments," vol. 26, No. 6, Nov. 1983, pp. 2817–2819.

*IBM Technical Disclosure Bulletin,* "Token Ring Local Area Network to X.25 Wide Area Network Gateway," vol. 36, No. 6B, Jun. 1993, pp. 61–68.

*IBM Technical Disclosure Bulletin,* "Method for Consistent Data Replication for Collection Management in a Dynamic Partially Connected Collection," vol. 33, No. 5, Oct. 1990, pp. 454–464.

*IBM Technical Disclosure Bulletin,* "Distributed Exception–Processing for Manufacturing Process Control," vol. 32, No. 10A, Mar. 1990, pp. 308–309.

*IBM Technical Disclosure Bulletin,* "Automatic Retry in PC–Host Processing," vol. 31, No. 11, Apr. 1989, pp. 247–248.

*IBM Technical Disclosure Bulletin,* "Logical IPL Selection Mechanism," vol. 29, No. 2, Jul. 1986, pp. 491–493.

*IBM Technical Disclosure Bulletin,* "Increased Hardware Error Isolation During Disk CSIPL," vol. 26, No. 11, May 1984, pp. 5945–5946.

*IBM Technical Disclosure Bulletin,* "Text Processing Terminal Interface With Public Data Networks," vol. 25, No. 12, May 1983, p. 6470.

*IBM Technical Disclosure Bulletin,* "Keyboard Interface Device," vol. 25, No. 11B, Apr. 1983, pp. 6039–6040.

*IBM Technical Disclosure Bulletin,* "Technique for a Plurality of Work Processing Terminal Sharing a Single Printer," vol. 24, No. 8, Jan. 1982, pp. 4105–4106.

*IBM Technical Disclosure Bulletin,* "Infrared Microbroadcasting Network for In–House Data Communication," vol. 24, No. 8, Jan. 1982, pp. 4043–4046.

*IBM Technical Disclosure Bulletin,* "Auto Retry Apparatus for Diskette Controllers," vol. 23, No. 8, Jan. 1981, p. 3567.

*IBM Technical Disclosure Bulletin,* "Character Synchronization During Overrun Conditions," vol. 20, No. 7, Dec. 1977, pp. 2568–2569.

*IBM Technical Disclosure Bulletin,* "Dynamic Quickcell," vol. 17, No. 2, Jul. 1974, pp. 361–364.

FIG. 3A
AFT REQUEST CONNECTION STATE MACHINE

SYSTEM FOR CONTROLLING CONNECTION REQUESTS BY EACH IO CONTROLLERS STORING AND MANAGING A REQUEST QUEUE WHEREIN ADDITIONAL CHANNEL ADDRESSES CAN BE ADDED

This application is a continuation of application Ser. No. 08/316,994, filed on Oct. 3, 1994, which was abandoned upon the filing hereof.

BACKGROUND OF THE INVENTION

1. Technical Field of the Invention

The present invention relates to method and apparatus for controlling communications between processing units and peripheral devices in a data processing system, and more particularly to efficiently providing connection between a processing unit and a peripheral device across the communications channel when a busy or conflict condition has been detected on the channel.

2. Prior Art

Prior art data processing systems include apparatus and methods for presenting requests for reconnection between a peripheral device and a processing unit, perhaps through an I/O controller and a channel across a communications link after an initial request for connection has been denied due to a busy condition detected in some element of the system. In such systems, a process generally implemented in software, partially built a request for connection frame message and directs apparatus to send the frame along one or more paths to a channel located at the processing unit. Monitoring the various interfaces to keep track of which ones have successfully reconnected and which have not is tedious and time consuming. Such monitoring can needlessly consume valuable processing resources in the controller subsystem when the communications link or a switch connected between a channel and the controller in the communications link is busy and which frustrates the controller attempts to reconnect to the channel.

Busy conditions generally require the subsystem to postpone reconnection attempts to redrive another request for reconnection frame to the same channel or to redrive another request for reconnection to a different channel to meet the controller needs for connection to the processing unit. Some prior art systems provide an automatic frame transmission process which automatically starts whenever a request for channel service exists and the controller resources are available. Further, some of the prior art systems provide for a flexible number of retry attempts to allow for performance tuning of the system. The retry process should be able to differentiate between retriable busy conditions and nonretriable busy conditions.

In any event, none of the prior art of which Applicants are aware teach nor suggest a channel to controller communication system including a retry mechanism having the capability of adding additional addresses into the process without interrupting operation, and which identifies unsuccessful reconnection attempts.

SUMMARY OF THE INVENTION

Accordingly, it is an object of the present invention to connect a peripheral device controller to a channel in a central processing complex by a method and apparatus which provides flexibility in the number of channel addresses which may be used for a connection attempt, also including a process to add additional channel addresses without interrupting the communication process and which notifies the requester that the connection attempt has been unsuccessful.

It is a further object of the present invention to connect a peripheral device controller to a central processing complex channel across a transmission interface by an automatic frame transmission function including apparatus and method including a queue of reconnection requests under the control of a state machine which reads the queue, loads and sends frames from the sending unit to the target unit (such as from a controller to a channel), manages a redrive timer, and automatically redrives or terminates automatic frame transmission processing depending on system parameters and responses received from the target such as a channel or another peripheral device controller.

A data processing system embodying the present invention includes a central processing complex consisting of one or more processor units, each of the processor units having one or more input/output channels, a transmission medium connected to each of the input/output channels, one or more peripheral device controllers such as for controlling one or more direct access storage devices (DASD). In systems having more than one input/output channel, it is common to include a switching mechanism connected between the input/output channels and the control devices for enabling connection between one of a number of controllers and one of a number of channels. Each control device will include an automatic frame transmission function which includes apparatus and method for controlling transmission of frames of information between the control device and the channel. A queue of reconnection requests is constructed and a state machine controls the queue. For example, the state machine reads the queue, loads and sends frames from the controller to the channel, manages a redrive timer and automatically redrives or terminates automatic frame transmission processing depending on system parameters and responses received from the channel or from another controller in controller to controller transmissions.

It is a feature and advantage of the present invention that the automatic frame transmission process is not constrained by apparatus to only work with a fixed number of channel and addresses at one time.

It is another feature and advantage of the present invention to allow additional channel addresses to be included in the automatic frame transmission process without interrupting the operation.

Another feature and advantage of the present invention is that the system is notified when an automatic frame transmission has been unsuccessful in the attempt to reconnect.

Yet a further featured advantage of the present invention is that peer to peer connection between two control units is supported without system modification.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
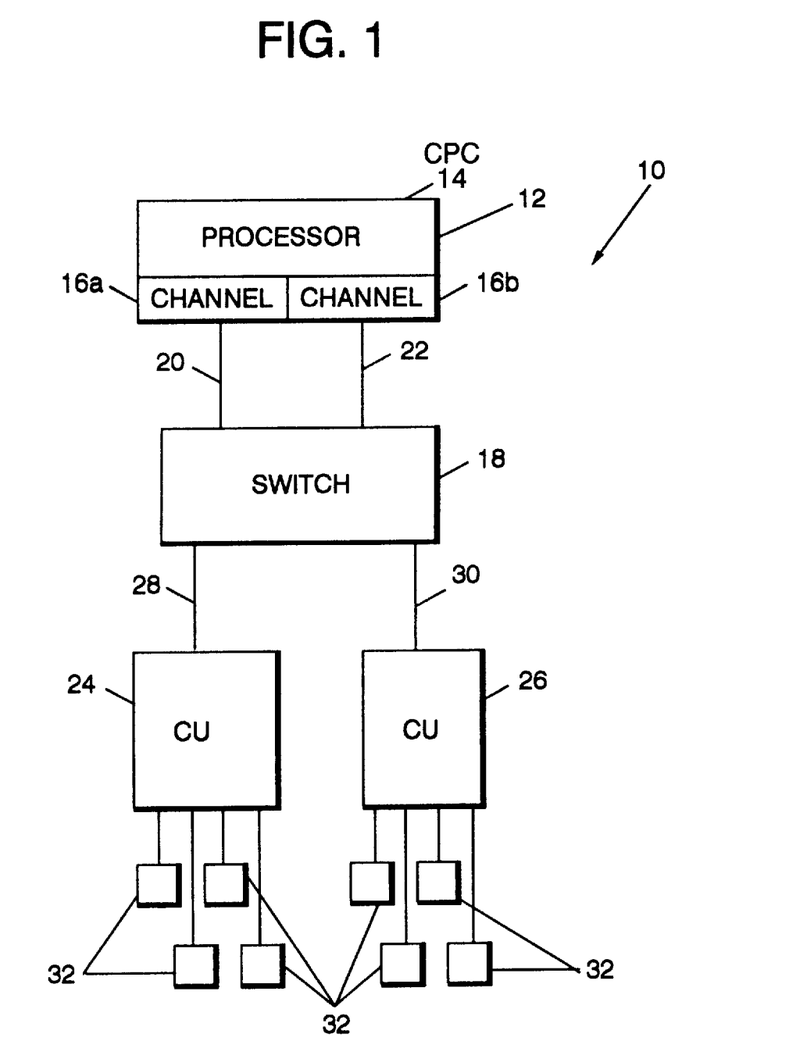
FIG. 1 is a block diagram of a data processing system embodying the present invention.

Referring now to FIG. 1, a preferred embodiment of the present invention will be described. FIG. 1 is a block diagram of a data processing system which includes a central processing complex 12 including one or more processors 14 each having one or more input/output channels 16a, 16b. Each channel 16a, 16b is connected to a transmission medium 20, 22, respectively, which may be a fiber optic transmission medium or the like. Input/output channels 16a, 16b may operate very efficiently using the Enterprise System Connection architecture (ESCON®) which is a high-speed channel to controller architecture developed by International Business Machines Corporation. ESCON® is a registered trademark of International Business Machines Corporation. The ESCON® architecture is described in U.S. Pat. No. 5,101,477 which patent is incorporated by reference herein for the description of the serial channel to controller architecture.

In multiple channel, multiple control unit data processing systems, it is advantageous to include a switch such as switch 18 shown in FIG. 1. The switch allows a number of different channels for different processors to be connected to a number of different controllers so that data can be stored and retrieved on any one of a number of different data storage devices from any of a number of processor channels in the system. Switch 18 may be implemented by a commercially available product, the IBM 3814 communications switching unit. Switch 18 is connected to controllers 24 and 26, respectively, as examples, by transmission media 28 and 30, respectively. Transmission medium 28 and transmission medium 30 may advantageously be embodied as fiber optic communications medium.

Control units 24 and 26, respectively, may be implemented by commercially available products IBM 3990 Model 6. Each control unit 24 and 26 control and is connected to a number of direct access storage devices 32 or other peripheral devices.

Further details of the ESCON® architecture and the frame structure is shown in U.S. Pat. No. 5,025,458. This patent is hereby incorporated by reference in this Application.

Figure 2:
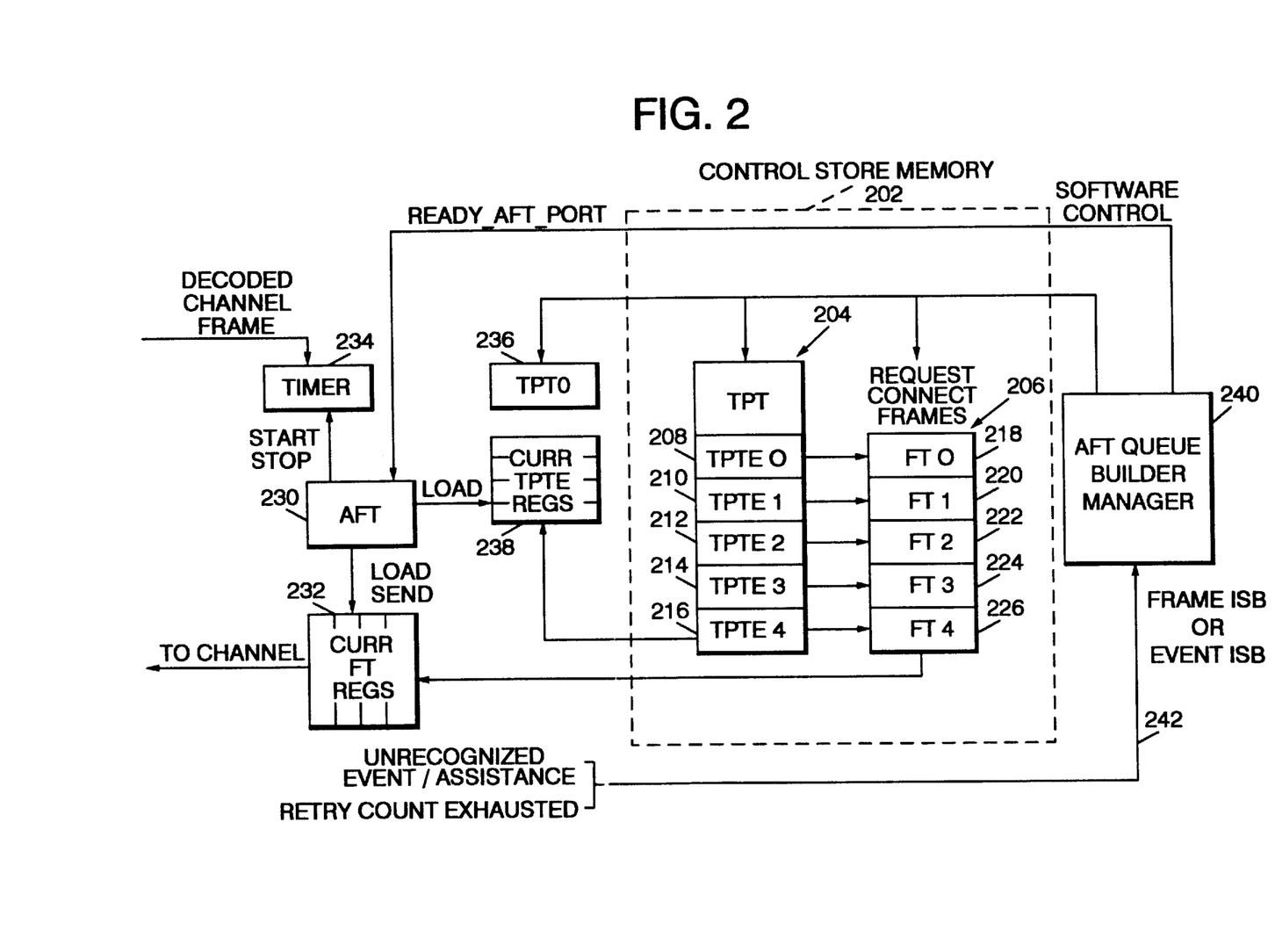
FIG. 2 is a block diagram of the subsystem for controlling the automatic frame transmission process in accordance with the present invention.

Referring now to FIG. 2, the apparatus and method implementing the automatic frame transmission method in accordance with the present invention will be further described.

Control units 24, 26 (see FIG. 1) each include a control store memory 202 (FIG. 2) which includes a transmitter port table TPT 204, which is the automatic frame transmission reconnection request queue, and storage for control blocks in Frame Template FT 206, which contain images of frames to be transmitted by automatic frame transmission function. Transmitter port table 204 includes a number of entries TPTE 208, 210, 212, 214, 216, etc. wherein each entry represents one reconnection request to one channel path. Each entry in TPT 204 such as entry 208 contains a pointer to one of the control blocks 218, 220, 222, 224, 226 in frame template 206. For example, transmitter port table entry 208 has a pointer to control block 218, entry 210 has a pointer to control block 220, entry 212 has a pointer to control block 222, entry 224 214 has a pointer to control block 224, and entry 216 has a pointer to control block 226, respectively.

The automatic frame transmission function is controlled by state machine (AFT) 230. State machine 230 is shown in greater detail in FIG. 3. State machine 230 controls reading of the reconnection request queue 204, starting the reconnection request process, loading and sending frames from control block 206 to current frame transmission registers 232 and then on to the communications channel on transmission medium 28 or 30. State machine 230 controls timer 234 which in turn controls the timing of redriving request for connection. The automatic frame transmission process is managed by AFT queue builder and manager 240 which controls state machine 230, and transmitter port table origin register 236 which stores the starting address of transmitter port table 204 and control memory 202 where software loads for the transmitter port table entries 208, 210, 212, 214, 216 can be found. Current transmitter port table entry register 238 stores the current transmitter port table entry which is loaded from one of transmitter port table entries 208, 210, 212, 216 and 218, respectively, in control store 202 all under the control of state machine 230.

The automatic fiame transmission queue builder and manager 240 is triggered by an event on line 242 such as retry count exhausted or an unrecognized event.

Other components of the control unit system are shared between the automatic frame transmission function and other functions, for example response frame decoding, interrupt status block building, etc.

Referring now to FIG. 3, the state machine 230 will be described in greater detail.

OPERATION OF A PREFERRED EMBODIMENT OF THE INVENTION

The operation of the preferred embodiment of the invention will be described with reference to the flow chart of FIG. 3 and tables 1, 2 and 3 below.

Table 1 which follows shows the definition of the transmitter port table entries in transmitter port table 204. Each entry may advantageously be 32 bytes long and aligned on a 32 bytes boundary address.

TABLE 1

Transmitter Port Table Entry (TPTE)

| Byte(s) | Field Name | Description |
|---|---|---|
| 0 | Zeros | Unused |
| 1 | Number_of_Attempts | This count specifies the maximum number of times the AFT frame may be sent. It can be any value from 0–255. This count can be updated by hardware if the |

TABLE 1-continued

Transmitter Port Table Entry (TPTE)

| Byte(s) | Field Name | Description |
|---|---|---|
| | | Enable_Counter (defined below) is also active. |
| 2–3 | Flags | Bits 0–12 are always zero.<br>• Bit 13—Pending_Automatic_Frame_Transmission: If the AFT is active, and the TP has successfully transmitted a frame associated with its current TPTE, then hardware will set the Pending_Automatic_Frame_Transmission (PAFT) bit. Hardware will reset the bit depending on the channel response frames it receives. If the AFT process terminates, without any recognized response to the AFT frame being received, then PAFT stays set. Any future Channel Event ISB produced after AFT terminates, will contain a copy of the PAFT.<br>• Bit 14—Frame_Type: During AFT processing, this bit is used to instruct the Receiver_Input_Port (RIP) on how to process responses to the AFT sent frames. Specifically, when Frame_Type is set to 0 the RIP will process and then discard a Connection Refused Frame if the AFT is active. When this bit is set to 1 RIP will treat a Connection Refused frame as an unrecognized frame. Unrecognized frames are passed to software via an ISB.<br>• Bit 15—Enable_Counter: When this bit is set (Enabled) the TP will decrement TPTE. Number_of_Attempts each time this TPTE is fetched. If this bet is reset, hardware will not decrement Number_of_Attempts. Disabling the counter may be used by software when there is no requirement for this TPTE to be removed from the queue. For example, the case where there is a single reconnection path available or an error recovery procedure requires a single path reconnection. If software disables the counter, it must set Number_of_Attempts to a non-zero value to insure Automatic Frame Transmission processing continues. |
| 4–7 | Frame_Template_Pointer | Points to the Frame Template containing the requested frame. |
| 8–9 | TPTE | Set by Software to the address of the next TPTE in the queue. This field must contain a pointer to the next TPTE prior to Software issuing a Ready_AFT_Port order. If AFT is not in progress then Software must insure that the last TPTE in the queue points to the first TPTE. This is accomplished by setting the Next TPTE field to the first TPTE. If there is only one TPTE in the queue then the TPTE_Next_TPTE will point to itself. |
| 10–31 | Zero's | Unused |

Frame templates 206 are generated by AFT queue builder and manager 240 for frames sent in the idle state such as request reconnection frames or command frames. Frame templates must be aligned on an 8 byte boundary. At any time, one or more frame templates may be ready to be sent to the transmitter port through current transmitter port registers 232. Table 2 (below) shows the format of the transmitter frame template. The first 4 bytes of the frame template are processed to determine frame length. Frame length specifies how many additional bytes are required to build the frame. The frame templates word count specifies how many words are required to be transferred from control store 202. The remaining bytes are then transferred from control store 202 and more particularly from the frame template entries 218, 220, 222, 224 and 226, respectively, to the transmit port through current frame template registers 232 and then to communication link 28, 30.

TABLE 2

Frame Template (FT)

| Byte(s) | Field Name | Description |
|---|---|---|
| 0 | | Unused |
| 1 | Frame_Length(n) | This one byte field contains the length of the frame. The length does not include the frame delimiters nor the frame CRC. The maximum frame length is 255 bytes. |
| 2 | Word_Count | This field contains an integer value set by software to the number of words (4 byte word) required to hold the frame. For example a 15 byte frame, Word-Count would be set to a value of 4. Word_Count can be calculated using the following formula Word_Count - (Frame_Length + 3)/4). |
| 3 | Frame_Delimiters | This field contains the Start of Frame (SOF) and End of Frame (EOF) |

TABLE 2-continued

Frame Template (FT)

| Byte(s) | Field Name | Description |
|---|---|---|
| | | delimiters. Bits 0–5 are zero (unused). Bit 6 is the EOF_Type where 0 = Passive_SOF and 1 = Connect_SOF. Bit 7 is the EOF_Type where 0 = Passive_EOF and 1 = Disconnect_EOF. |
| 4 | Frame_Byte(0) | Content of frame byte 0. |
| . | . | . |
| . | . | . |
| . | . | . |
| (3 + n) where n > 0 | Frame_Byte(n − 1) | These bytes define the contents of the frame to be transmitted. |

Prior to issuing a ready AFT port order, the following must be constructed or initialized:

A transmitter port table with one or more valid entries;

one or more transmitter frame templates stored in control blocks such as 218, 220, 224 and 226;

transmitter port table origin register 236; and timer 234 must be initialized.

The automatic frame transmission initialization is accomplished by setting the state machine to idle followed by a ready AFT port order.

When the ready AFT port order is issued in the idle state of state machine 230, the AFT process is started. The ready AFT port order causes the system to use the logical port number specified in the order as an offset from the transmitter port table origin register 236 to fetch from the AFT queue 204 one or more transmitter port table entries 208, 210, 212, 214 or 216. The AFT state machine 230 will only load one transmitter port table entry 218, etc. from control store at any given moment. However, depending upon a chain of transmitter port table entries for a given session, the AFT hardware may process several entries before control is returned to the software. Once the AFT process has been started it will continue as long as the hardware remains in idle state. Any event that causes hardware to leave the idle state, will also terminate the automatic frame transmission process. Once AFT process has been started, any subsequent ready AFT port order issued will be treated as a non-operation. If a ready AFT port order is issued by software when the hardware is not in idle state, the order is also treated as a non-operation. An AFT queue will be established for each transmitter port for any control unit having multiple transmitter ports.

Once the AFT process has been initiated, additional port table entries may be added to the queue. However, entries may not be removed from the queue as long as AFT is in progress. Entries may be removed from the queue when the state machine is no longer in the idle state. When the state machine 230 has been set to idle and a ready AFT port order has been issued, the following steps will be taken:

(1) The transmitter port table entry pointed to by the ready AFT port order will be fetched.

(2) The first ready AFT port order issued after setting Idle state will enable the Automatic Frame transmission processing. Automatic Frame transmission processing will stay enabled until an event occurs which moves state machine 230 from the Idle state to the Wait state.

(3) If transmitter port table entry number of attempts is equal to zero, then the transmitter port will set the frame transmission count equal zero bit in the internal event register (not shown). The loading of the internal event register will cause the system to generate an interrupt. The interrupt will contain a pointer to the table port entry which caused the interrupt condition. No frame will be transmitted for this entry. The state machine will move to the Wait state and the automatic frame transmission process is terminated.

If the transmitter port table entry number of attempts is not equal to zero the system will:

(1) If transmitter port table entry flag enable counter is set, then the transmitter port table entry number of attempts is decremented by 1. If the transmitter port table entry enable counter is reset then the transmitter port table entry number of attempts is not decremented. The frame contained in the frame template such as 218, pointed to by the transmitter port table entry frame template pointer from entry 208 in transmitter port table 204 is then fetched and transmitted. Contents of the frame are not validated by hardware. When the frame has been transmitted, a pending automatic frame transmission bit is set and a 50 microsecond timer is restarted. The state of the pending automatic frame transmission bit will be included in any subsequent interrupt status block (ISB) generated with interrupt status of channel events detected and channel events detected with error. If this bit is set when hardware leaves the Idle state, the bit must be reset prior to restarting the automatic frame transmission process.

If the automatic frame process has been started and Pending Automatic Frame Transmission is set and if the TPTE flags frame type=discard connection refused then if a Connection Refused, Link Busy, Destination Port Busy, or Source Port Busy (unconnected) Frame is received, hardware will reset the Pending Automatic Frame Transmission bit and discard the received frame. Any other frame received is stored and an ISB with interrupt status of channel event detected is generated.

If the received frame is a Connection Refused or a Link Busy Frame hardware will wait for the 50 microsecond timer to expire before fetching the next TPTE and sending another request to reconnect to the channel.

If the received frame is a Destination Port Busy or a Source Port Busy (unconnected) hardware will fetch and send the next request to reconnect without waiting for the 50 microseconds timer to expire.

If the automatic frame process has been started and Pending Automatic Frame Transmission is set and if the TPTE flags Frame Type equals Store Connection Refused then if a Link Busy, Destination Port Busy, or Source Port Busy (unconnected) frame is received, hardware will reset the Pending Automatic Frame Transmission bit and discard the received frame.

If any other frame is received which is not decoded or handled by the hardware, then an ISB with interrupt status of channel event detected is generated. If the received frame is a Link Busy Frame hardware will wait for the 50 microsecond timer to expire before fetching the next TPTE. If the received frame is a Destination Port Busy or a Source Port Busy (unconnected) hardware will fetch the next TPTE without waiting for the 50 microsecond timer to expire.

Hardware continues to cycle through the queue fetching TPTE's as defined by the Next TPTE as long as hardware remains in the idle state. Next TPTE will point to itself for a queue of one.

Any event which causes the hardware to go from Idle state to Wait state results in an interrupt being presented to software and terminates the automatic frame transmission processing.

Software may not remove any TPTE from the queue while hardware is in Idle state. If software wishes to remove a TPTE while hardware is in Idle state, software must set the interrupt when in Idle bit in the Interrupt Control Register (not shown) and wait for the Interrupt indicating hardware has left Idle state.

When hardware is not in Idle state, software may modify the TP queue. Software must insure that no hardware activity conflicts with modifying this queue.

There is no limit on the number of TPTEs that can be added to the queue. Software may add TPTEs either before or after starting the automatic frame transmission process.

If automatic frame transmission is not in progress then software must insure that the last TPTE in the queue points to the first TPTE. This is accomplished by setting the next TPTE field to the first TPTE. If there is only one TPTE in the queue then the TPTE next TPTE will point to itself. If software adds an TPTE to the queue when the automatic frame transmission is in progress then the software must do the following:

(1) First set the next TPTE field of new TPTE to point to the first TPTE in the queue.

(2) Then set the next TPTE of the last TPTE in the queue to point to the new TPTE.

(3) Software may optionally issue a ready AFT port order.

Hardware must not write to this field under any circumstances.

Referring now to FIGS. 3A, 3B, 3C, and 3D, the AFT request connection state machine 230 which controls the operation of the preferred embodiment of the present invention will be described. State machine 230 has 5 states, state 0, the Idle state; state 1 which is described in more detail with reference to FIG. 3B; state 2, which is a wait state; state 3, which is described in more detail with reference to FIG. 3C; and state 4, which is described in more detail with reference to FIG. 3D. Additionally, there is a wait state 302 which communicates with state 0, 304, the Idle state.

Figure 3A:
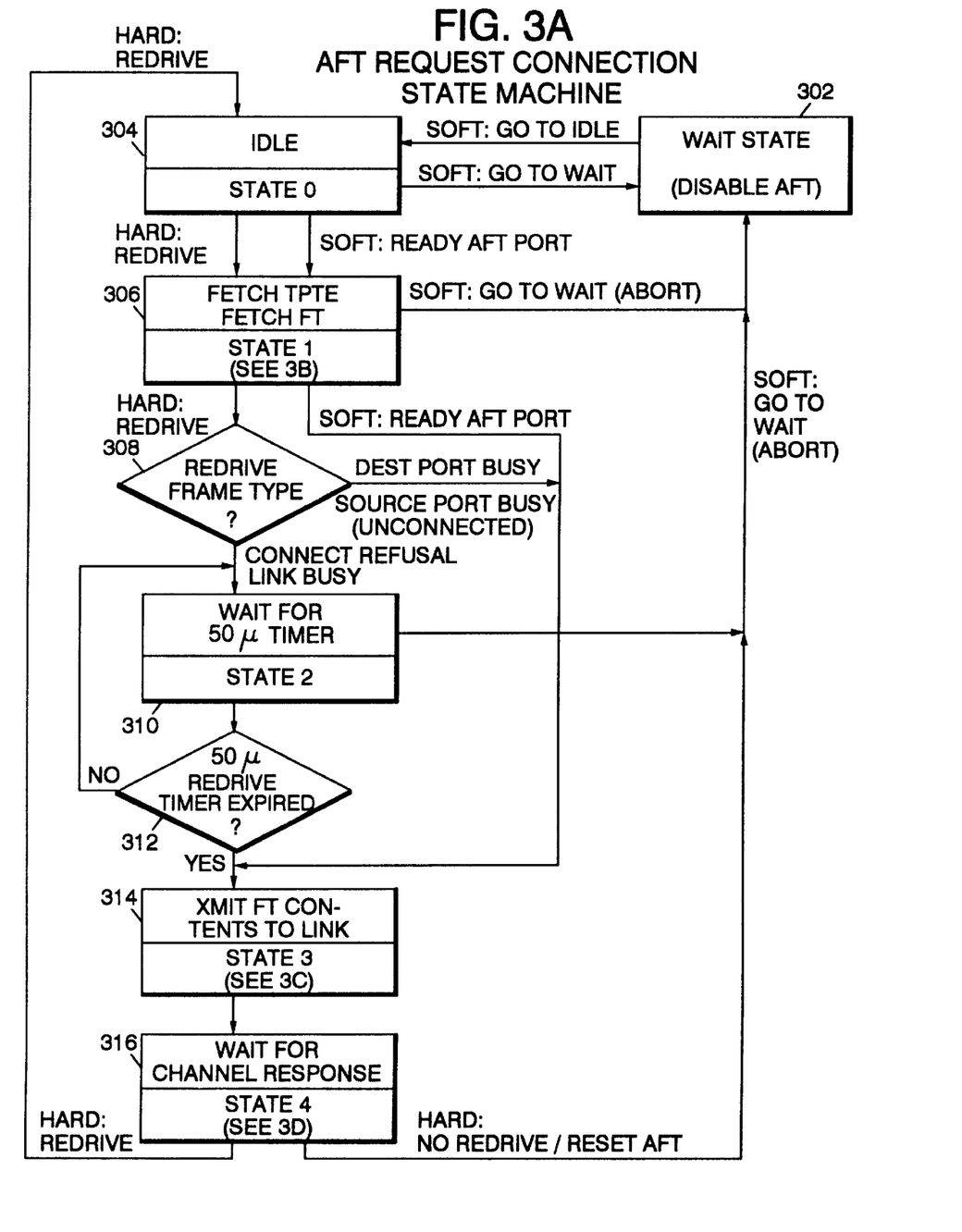
FIGS. 3A, 3B, 3C and 3D together are a diagram of the state machine which controls the process of FIG. 2 in accordance with the present invention.

As described above, any event which causes the state machine 230 to go to the wait state 302 disables the automatic frame transmission process. The communication between wait state 302 and Idle state 304 is under software control. With commands such as Go To Idle or Go To Wait.

From Idle state 0 304 state machine 230 moves to state 1 306 when software sends a ready AFT port command. State 1 causes a fetch of the TPTE and a fetch of the FT 206. If any event occurs which causes state machine to return to the wait state, the AFT process is aborted.

In certain situations involving a redrive for a reconnect, the hardware will cause a redrive command to move state machine 230 from state 0 304 to state 1 306 again to fetch the TPTE and the FT 206. In a software driven ready AFT port command, the redrive frame type test 308 and the wait for timer state 2 310 and redrive timer expired test 312 are bypassed and there is a direct movement from state 1 to state 3 314 during which the contents of frame template are transmitted to the communications link. If a hardware redrive is being performed, state machine 230 proceeds from state 1 306 to redrive frame type test 308. If either the destination port is busy or the source port is busy, state machine proceeds directly to state 3 314 as described above. If a connection refused frame or a link busy frame is received, the timer 310 in state 2 causes a loop until the redrive timer expires 312. After redrive timer expires in step 312, state machine 230 proceeds again to state 3 wherein the frame template is transmitted to the communications link.

After the information is put on the communications link in state 3 314, state machine 230 moves to state 4 316 and waits for a response from the channel.

In redrive situations, the state machine then progresses from state 4 back to the Idle state state 0 304. If there is no redrive, the state machine 230 moves from state 4 316 to the wait state 302 and the automatic frame transmission process is reset.

Figure 3B:
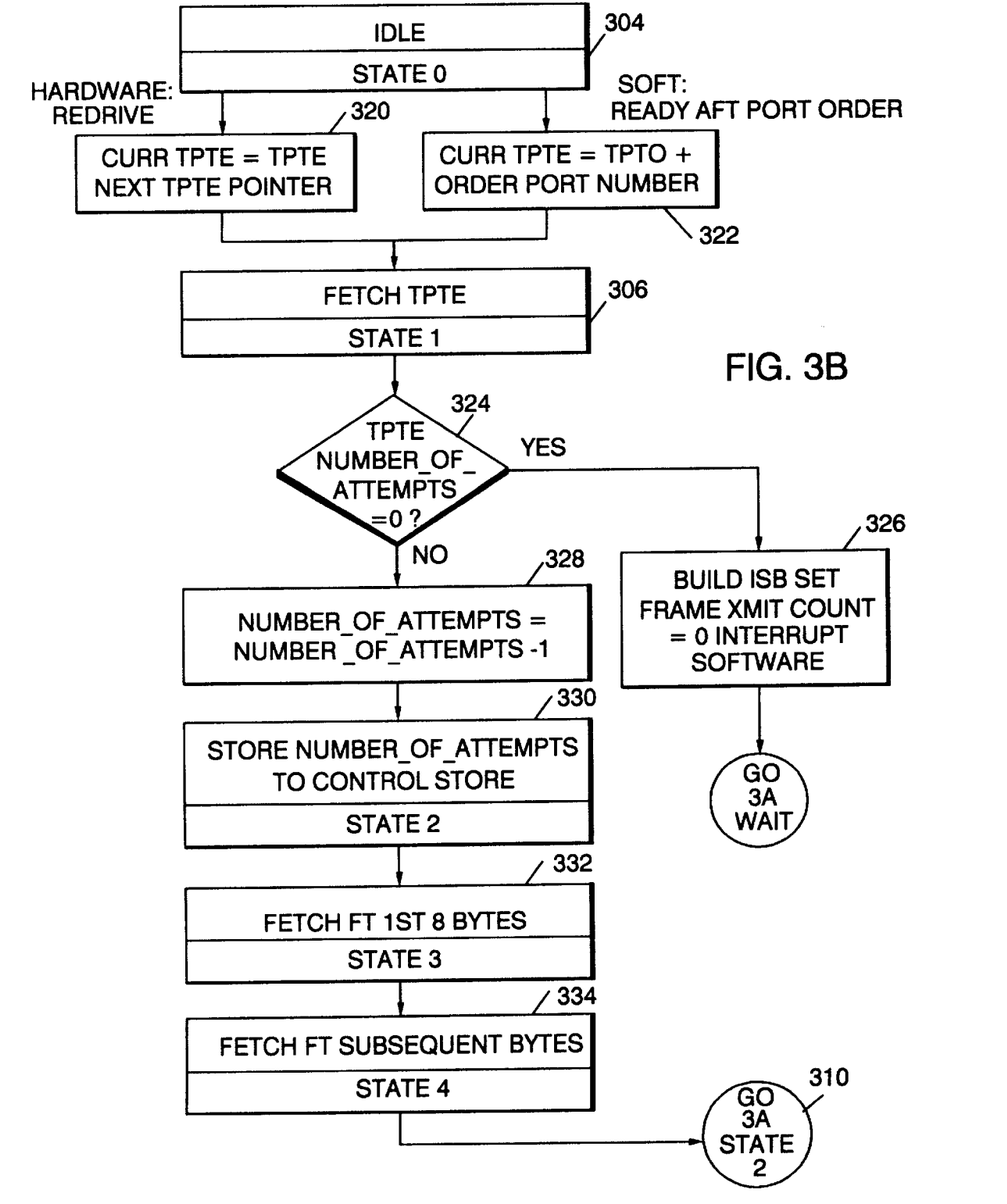

Referring now to FIG. 3B, state 1 306 will be described in greater detail. If hardware redrive is required, state machine 230 advances from Idle state 304 to state 1 306 which is divided into separate sections depending upon whether the activity is a redrive or a ready AFT port order. If a redrive, the current TPTE is set to equal the contents of the TPTE control block field named Next_TPTE_ Pointer. On a ready AFT port order, at 322 current TPTE is set to equal TPTO plus the order port number. State machine 230 then proceeds to state 1 306 and TPTE is fetched. Next, the number of attempts is tested. If equal to 0, an ISB is built 326 and the frame transmit count is set to 0 and the state machine returns to the wait state 302.

If number of attempts is not equal to 0, the number of attempts is decremented by 1 328 and the number of attempts is stored 330 to control store. The first 8 bytes of the frame template are fetched 332 and then subsequent bytes of the frame template are fetched 334. After all bytes of the framed template have been fetched, state machine 230 returns to state 2 310.

Figure 3C:
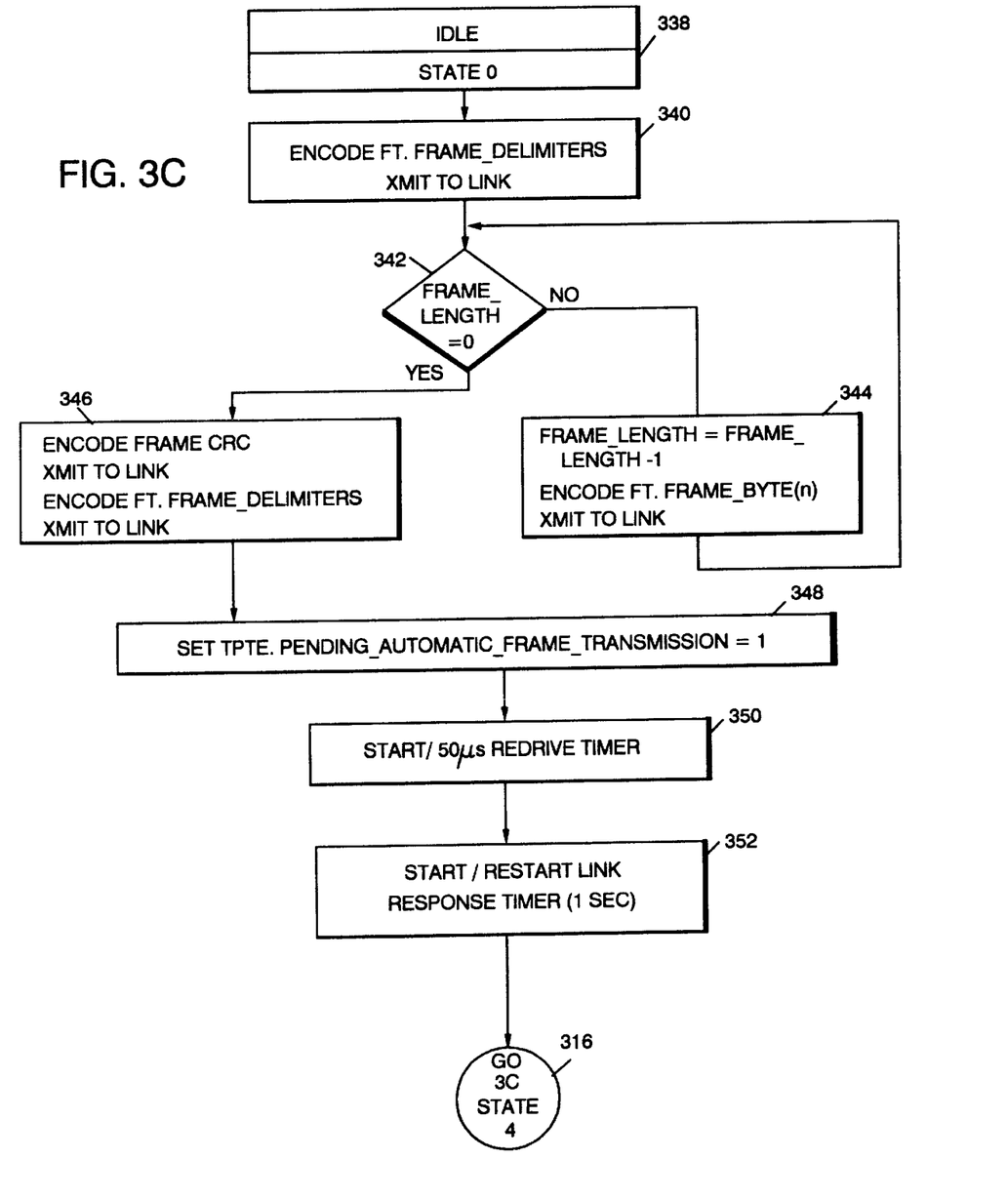

Referring now to FIG. 3C, state 3 transmission of frame template contents to communications link will be described in greater detail.

From a substate machine Idle state 0 338, the substate machine proceeds to encode frame template frame delimiters and transmit 340 to communications link. If the frame length is not equal to 0 342, the frame length is decremented by 1 and frame template frame byte n is encoded and transmitted 344 to the communications link. This process loops back to the test for frame length equal to 0 342 until all bytes of the frame have been transmitted. At that point, the frame CRC is encoded and transmitted to the communications link 346 and the frame template frame delimiters are transmitted to communications link. The substate machine then proceeds to set TPTE pending automatic frame transmission equal to 1 348 and the 50 microsecond redrive timer is started 350. Next, the link response timer is either started or restarted 352 after which the substate machine passes control to state machine 230 state 4 316.

Figure 3D:
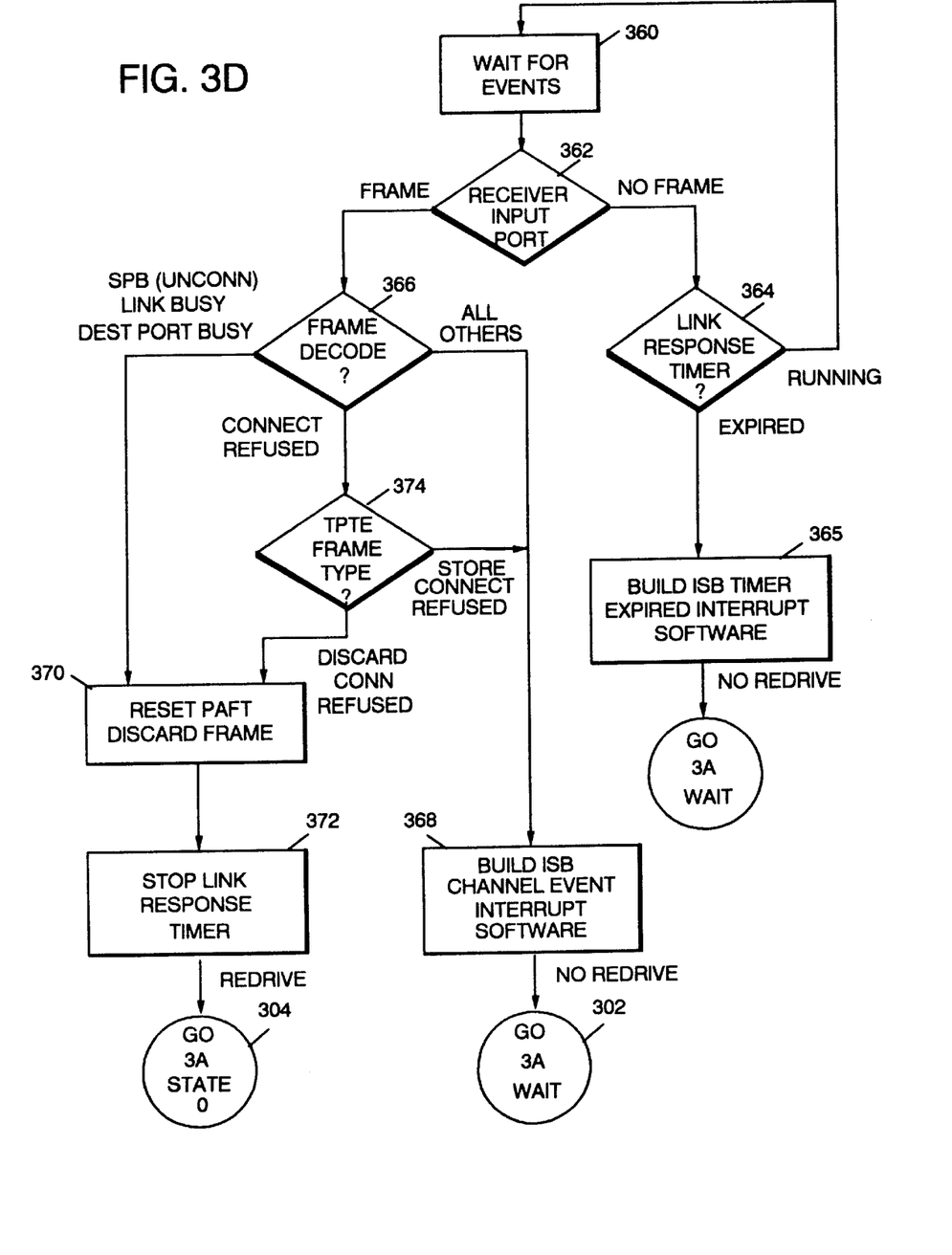

Referring now to FIG. 3D, state 4 of state machine 230 will be further described. In state 4, the state machine is waiting 360 for responses from channel 16a, 16b. Next, the receiver input port is tested 362 to determine whether a frame is present. If no frame is present, the link response timer is tested 364 to determine whether it is running in which case the process loops back to the wait for events step 360. If the link response timer has expired, an ISB is built 365 indicating timer expired interrupt. Next, the process returns to the wait state 302 in state machine 230.

If a frame has been detected at receiver input port at test 362, the frame is decoded 366. If the decoded frame type is a source Port Busy (unconnected), or link Busy frame, or a Destination Port Busy frame, then the state machine proceeds to reset the (PAFT) pending automatic frame transmission bit, discard the frame and stop the link response timer. Processing continues at state 0 304 of state machine 230.

If the decoded frame type is a Connection Refused frame, then the TPTE frame type bit is tested to determine subsequent processing. If the TPTE frame type equals discard connection refused, then the PAFT bit is reset, the connection refused frame is discarded, and the link response timer is stopped. Processing again continues to state 0 304 of state machine 230.

If the TPTE frame type equals store connection refused, then an ISB is built 368 indicating channel event interrupt and the machine returns to wait state 302 in state machine 230.

Any other frame decode condition proceeds from frame decode 366 to build ISB 368 as above.

Although the present invention and its advantages have been described in detail, it should be understood that various changes, substitutions and alterations can be made herein without departing from the spirit and scope of the invention as defined by the appended claims.

What is claimed is:

1. A data processing system, comprising:
   one or more processing units, each having one or more input/output channel units;
   one or more input/output control units, each controlling one or more peripheral devices; and
   a information transmission medium connected to each of said channel units and to each of said control units;
   each of said control units comprising an automatic frame transmission means for controlling connection requests originating in said control units to send information to one of said channel units, said automatic frame transmission means comprising;
   means for storing data relating to a connection request;
   means for maintaining a queue of connection requests;
   means for adding additional entries containing addresses of additional channel units to said queue without interrupting the operation of said processing system;
   means for managing said connection requests based on information in said queue; and
   means for retrying connection requests to a same channel unit or to a different channel unit following an unsuccessful connection attempt.

2. A data processing system, according to claim 1, wherein said information transmission medium further comprises switching means for connecting any one of said channel units to any one of said control units.

3. A data processing system, according to claim 1, wherein said means for managing further comprises a state machine for controlling operation of said automatic frame transmission means and one or more registers for temporary storage of data and pointers relating to said connection requests.

4. A data processing system, according to claim 3, wherein said means for managing further comprises a timer to control timing of said retry connection requests.

5. A data processing system, according to claim 1, wherein said means for maintaining a queue further comprises means for modifying a length of said queue from one entry to n entries.

6. A method for controlling transmission of information frames between any two units in a data processing system which includes one or more processing units, each having one or more input/output channel units, one or more input/output control units, each having an automatic frame transmission means and controlling one or more peripheral devices, and an information transmission medium connected to each of said channel units and to each of said control units, comprising the steps of:
   identifying, in one of said control units, a connection request originating in said control units to send information frames to another unit in said data processing system;
   storing, by said automatic frame transmission means, data relating to said connection request to a target unit;
   adding, by said automatic frame transmission means, additional entries containing addresses of additional target units to said queue without interrupting the operation of said processing system;
   managing, by said automatic frame transmission means, said connection requests based on information in said queue; and
   retrying, by said automatic frame transmission means, connection requests to said target unit or to one or more of said additional target units following an unsuccessful connection attempt.

7. A method, according to claim 6, wherein said step of maintaining a queue further comprises the step of modifying a length of said queue to a length of between one entry and n entries.

8. A method, according to claim 6, further comprising generating one or more frame templates, there being one frame template for each frame of information to be transmitted between one of said control units and one of said channel units.

9. A data processing system, comprising:
   one or more processing units, each having one or more input/output channel units;
   one or more input/output control units, each controlling one or more peripheral devices; and
   an information transmission medium connected to each of said channel units and to each of said control units;
   each of said control units further comprising:
      an automatic frame transmission means for controlling connection requests originating in said control unit to send information to one of said channel units, said automatic frame transmission means comprising:
         a reconnection request queue storage;
         a frame storage for storing frames to be transmitted in response to a connection request;
         a state machine control means for controlling the operation of said automatic frame transmission means; and
         a retry timer which controls timing of retries for connection after a failed attempt at connection in response to said state machine.

10. A data processing system according to claim 9 wherein said automatic frame transmission means further comprising:
    a queue builder and manager which controls said state machine; and
    an origin register which stores a starting address for said request queue storage.

* * * * *